May 2, 1933.  C. A. MAXWELL  1,906,478

TUBE EXPANDER

Original Filed Nov. 24, 1928  2 Sheets-Sheet 1

INVENTOR
Carl A. Maxwell
BY
Gifford & Seall
ATTORNEYS

May 2, 1933.   C. A. MAXWELL   1,906,478
TUBE EXPANDER
Original Filed Nov. 24, 1928   2 Sheets-Sheet 2

INVENTOR
Carl F. Maxwell
BY
Gifford & Scull
ATTORNEYS

Patented May 2, 1933

1,906,478

UNITED STATES PATENT OFFICE

CARL A. MAXWELL, OF ALLENTOWN, PENNSYLVANIA, ASSIGNOR TO THE BABCOCK & WILCOX COMPANY, OF BAYONNE, NEW JERSEY, A CORPORATION OF NEW JERSEY

TUBE EXPANDER

Application filed November 24, 1928, Serial No. 321,585. Renewed June 23, 1932.

This invention relates to a tube expander by means of which tubes can be expanded into a header or the like by inserting the expander through a hole that is at an angle to the hole into which the tube is to be expanded, so that it is not necessary to provide a hole in the header or the like in direct alignment with the hole that is to receive the tube.

Figure 1:
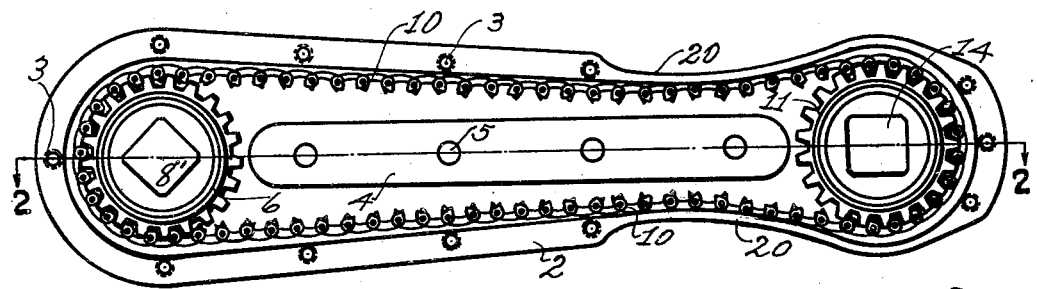
Figure 2:
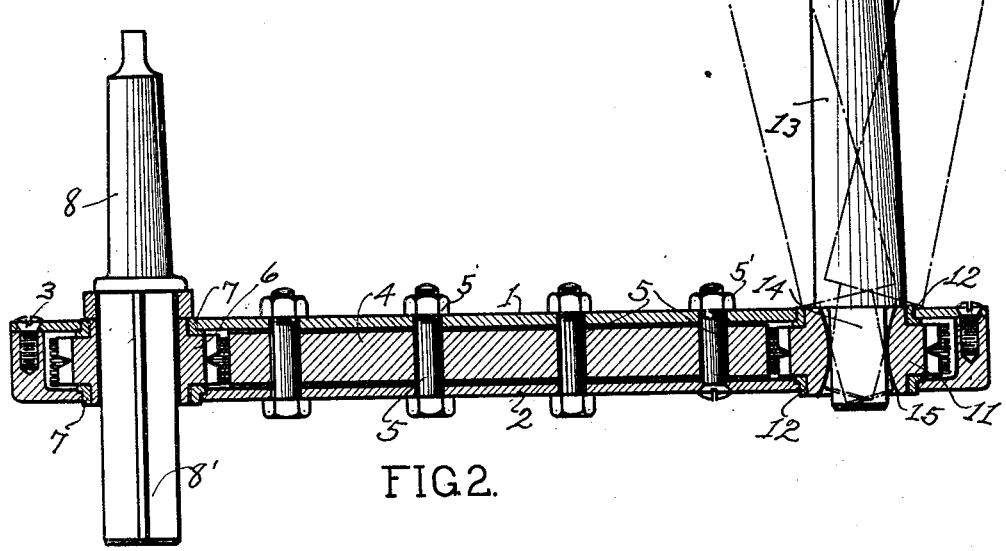
Figure 3:
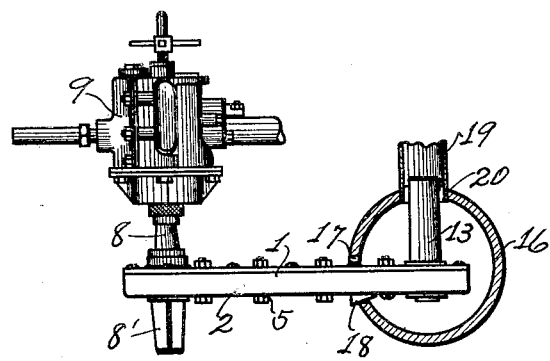
Figure 4:
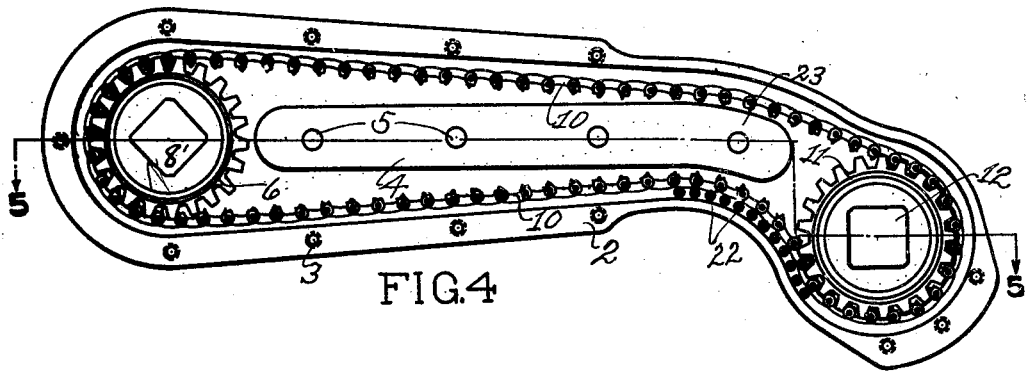
Figure 5:
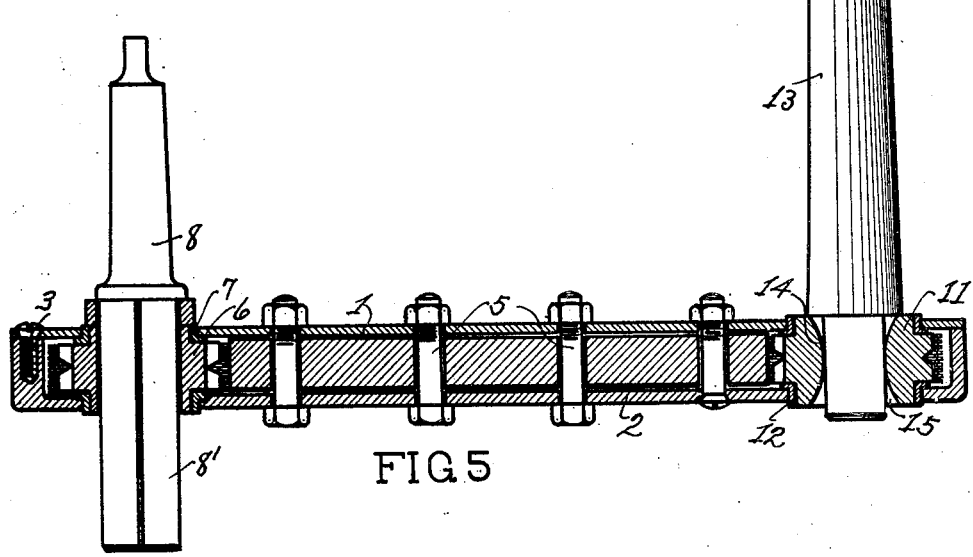
Figure 6:
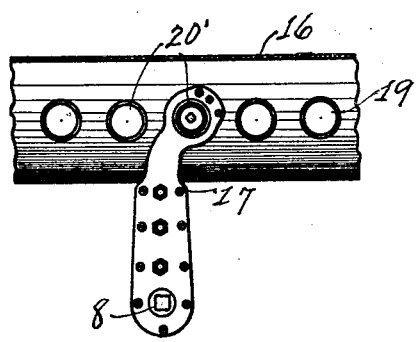

The invention will be understood from the description in connection with the accompanying drawings in which Fig. 1 is a plan view of the device with one side removed; Fig. 2 is a section along the line 2—2 of Fig. 1; Fig. 3 is a view showing a section through a header with the device in place; Fig. 4 is a view similar to Fig. 1 showing a modification; Fig. 5 is a section along the line 5—5 of Fig. 4; and Fig. 6 is a section through a header showing the modification in place.

In the drawings reference characters 1 and 2 indicate the sides of an elongated housing that are attached to each other by means of the screws 3. The housing is reduced at one end so that it can enter a hand hole. A spacer 4 is located between the side walls 1 and 2, and bolts 5 extend through the side walls and the spacer 4, and the sides 1 and 2 are kept in close contact with the spacer 4 by tightening up nuts 5'.

A driving sprocket 6 is journaled in bearings 7 in the side walls 1 and 2 near one end of the housing. A connecting member 8 connects the sprocket 6 to a driving mechanism, such as the motor 9, the connecting member 8 having a square portion that fits in a corresponding square hole through the center of the sprocket 6. The member 8 extends, as shown at 8', to provide for manual operation.

A sprocket chain 10 passes over the sprocket 6 at one end of the housing and over a similar sprocket 11 at the other end of the housing. The chain 10 passes along opposite sides of the spacer 4 so that this spacer is between the runs of the chain. The sprocket 11 is mounted in bearings 12 similar to the bearings 7, and an expander pin 13 is provided with a shoulder and square end portion that fits into a square hole 14 in the sprocket 11. The side walls of the hole 14 are rounded near the ends as shown at 15 to enable the pin 13 to occupy different positions as indicated by the solid lines and dotted lines in Fig. 1, so that the device may be located either at right angles to the hole into which a tube is to be expanded or at angles differing to a considerable extent from a right angle.

In Fig. 3, a header 16 is shown in section with the tube expander extending through a hand hole 17 in the side of the header with a wedge 18 extending into the hole 17 upon which the expander rests. The end of the tube 19 is shown in place in the hole 20 and the expander pin 13 is indicated in position for expanding the tube in the hole 20.

It will be understood that as the motor 9 drives the sprocket 6 through the connection 8, the sprocket 11 is driven by the chain 10 and the expander pin 13 is thereby operated to expand the tube in position. As the expander pin 13 rises, the outer end of the housing descends as the same is pivoted on the wedge 18, and the pin 13 is not restricted to a position at right angles to the housing due to the rounded ends 15 of the opening 14 into which the square end of the expander pin 13 extends.

The modification shown in Figs. 4, 5, and 6 is suitable for expanding tubes in headers in which there is a less number of hand holes than tube holes. In this modification the end of the housing that is to be inserted into the header is curved as shown in Fig. 4, and rollers 22 are journaled in bearings inside of the housing for the chain 10 to pass over, and the end of the filler member 4 is rounded as indicated at 23 for a similar purpose. Rollers may, of course, be journaled anywhere along the housing and filler member 4 to prevent the chain from wearing. The housing may also be filled with grease to prevent wear. The ends of the bearings 7 and 12 extend in a close fit through the sides of the housing and prevent the grease from escaping.

It will be clear from Fig. 6 how the device is used to expand a tube in a hole 20' spaced longitudinally along the header 16 instead of being even with this hole. When it is desired to expand a tube in the hole 20' on the other side of the hole 17 from that indicated in Fig. 6, it is only necessary to turn the expander 180° and insert the expander pin 13 from the other side from that in which it was located when expanding the tube in place as indicated in this figure.

I claim:

1. In a tube expander, a housing having a reduced portion to enter a hand hole, sprockets near opposite ends of said housing and mounted therein, a connection between said sprockets, means for driving one of said sprockets, and an expanding pin whose length is greater than its diameter carried by the other sprocket, and extending laterally therefrom.

2. In a tube expander, a housing, sprockets near opposite ends of said housing, a connection between said sprockets, and means for driving one of said sprockets, the other sprocket being provided with a polygonal opening with flaring ends for an expanding pin, whose length is greater than its diameter mounted within said opening.

3. In a tube expander, a housing, sprockets near opposite ends of said housing, a connection between said sprockets, a spacer between the sides of said housing and between the runs of said connection, means for driving one of said sprockets, and an expanding pin carried by the other sprocket.

4. In a tube expander, an elongated housing, sprockets and a chain in said housing, and an expanding pin carried by one of said sprockets substantially at right angles to the length of said housing, said housing being reduced at one end sufficiently to enter a hand hole of a header.

5. In a tube expander, a housing, sprockets mounted within and located near the opposite ends of said housing, a connection between said sprockets, means for driving one of said sprockets, and an expanding pin mounted on the other sprockets, the end of said housing in which said last-mentioned sprocket is mounted being curved whereby the expanding pin may serve a plurality of tubes located longitudinally of the head.

6. In a tube expander, a housing having a reduced portion to enter a hand hole of a header, sprockets near opposite ends of said housing and mounted therein, a connection between said sprockets, means for driving one of said sprockets, and an expanding pin whose length is greater than its diameter mounted on the other sprocket and extending laterally therefrom.

CARL A. MAXWELL.